United States Patent
Lee et al.

(10) Patent No.: US 10,630,434 B2
(45) Date of Patent: Apr. 21, 2020

(54) OPERATION METHOD OF COMMUNICATION NODE FOR SUPPORTING COORDINATED MULTI-POINT TRANSMISSION AND RECEPTION IN COMMUNICATION NETWORK

(71) Applicant: ELECTRONICS AND TELECOMMUNICATIONS RESEARCH INSTITUTE, Daejeon (KR)

(72) Inventors: An Seok Lee, Daejeon (KR); Tae Gyun Noh, Daejeon (KR); Yu Ro Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 107 days.

(21) Appl. No.: 15/885,009

(22) Filed: Jan. 31, 2018

(65) Prior Publication Data

US 2018/0219656 A1    Aug. 2, 2018

(30) Foreign Application Priority Data

Feb. 1, 2017 (KR) .......... 10-2017-0014640
Jan. 31, 2018 (KR) .......... 10-2018-0012164

(51) Int. Cl.
*H04L 5/00* (2006.01)
*H04B 7/024* (2017.01)
(Continued)

(52) U.S. Cl.
CPC .......... *H04L 5/0035* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS 8,750,882 B2    6/2014    Yang et al.
8,818,440 B2    8/2014    Ko et al.
(Continued)

FOREIGN PATENT DOCUMENTS

KR    10-1188996 B1    10/2012
KR    10-1463532 B1    12/2014
WO    WO-2014/109538 A1    7/2014

*Primary Examiner* — Adnan Baig
(74) *Attorney, Agent, or Firm* — Rabin & Berdo, P.C.

(57) ABSTRACT

An operation method of a communication node supporting a coordinated multi-point transmission and reception (CoMP) of a terminal based on a plurality of transmission points (TPs) included in a communication network may comprise allocating a resource for transmitting a pilot signal of the terminal; receiving quality measurement information of the pilot signal of the terminal from the plurality of TPs; determining a TP cluster supporting the CoMP of the terminal based on channel states among the plurality of TPs; transmitting information on the allocated resource and information on the TP cluster to the terminal and the TP cluster; and supporting the CoMP of the terminal based on the allocated resource and the TP cluster.

18 Claims, 5 Drawing Sheets

(51) Int. Cl.
  *H04W 72/04*    (2009.01)
  *H04B 7/06*     (2006.01)
  *H04W 72/08*    (2009.01)
  *H04B 7/0456*   (2017.01)

(52) U.S. Cl.
  CPC ......... *H04B 7/0626* (2013.01); *H04L 5/0048* (2013.01); *H04L 5/0053* (2013.01); *H04W 72/042* (2013.01); *H04W 72/085* (2013.01)

(56) References Cited

U.S. PATENT DOCUMENTS

| | | |
|---|---|---|
| 9,019,903 B2 | 4/2015 | Palanki et al. |
| 9,049,730 B2 | 6/2015 | Vajapeyam et al. |
| 9,264,204 B2 | 2/2016 | Seo et al. |
| 2008/0132262 A1 | 6/2008 | Jung et al. |
| 2010/0246560 A1 | 9/2010 | Kim |
| 2012/0188953 A1 | 7/2012 | Won et al. |
| 2013/0094479 A1* | 4/2013 | Park ............... H04L 5/0057 370/336 |
| 2015/0023278 A1* | 1/2015 | Boccardi ......... H04L 25/0224 370/329 |
| 2015/0103778 A1 | 4/2015 | Kim et al. |
| 2015/0312840 A1* | 10/2015 | Kazmi ............. H04W 40/244 455/456.2 |
| 2016/0094320 A1 | 3/2016 | Prasad et al. |
| 2017/0079047 A1* | 3/2017 | Lee ................. H04B 7/0413 |
| 2017/0141828 A1* | 5/2017 | Tosato ............. H04B 7/0663 |
| 2017/0279508 A1* | 9/2017 | Truong ............ H04B 7/0626 |

\* cited by examiner

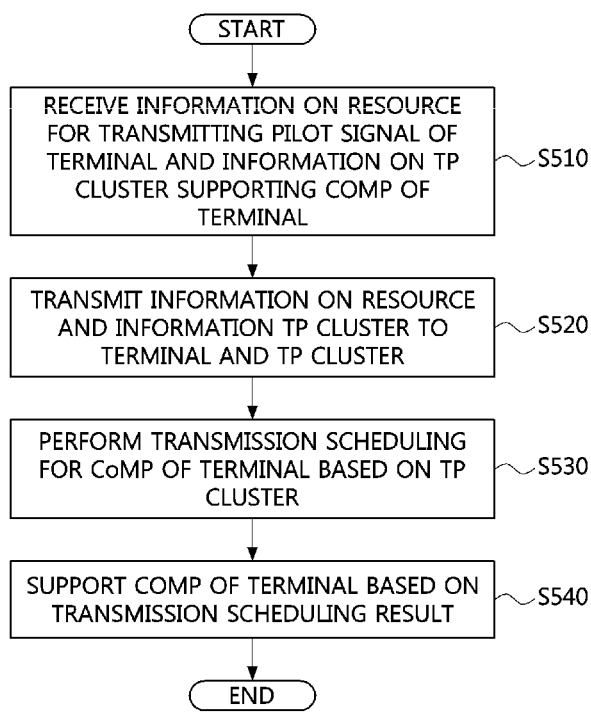
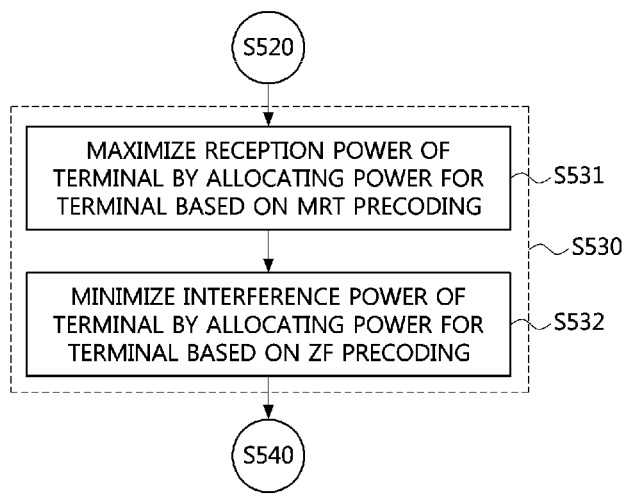

OPERATION METHOD OF COMMUNICATION NODE FOR SUPPORTING COORDINATED MULTI-POINT TRANSMISSION AND RECEPTION IN COMMUNICATION NETWORK

CROSS-REFERENCE TO RELATED APPLICATIONS

This application claims priority to Korean Patent Applications No. 10-2017-0014640 filed on Feb. 1, 2017 and No. 10-2018-0012164 filed on Jan. 31, 2018 in the Korean Intellectual Property Office (KIPO), the entire contents of which are hereby incorporated by reference.

BACKGROUND

1. Technical Field

The present disclosure relates to an operation method of a communication node for coordinated multi-point transmission and reception (CoMP) in a communication network, and more specifically, to an operation method of a communication node for communications through CoMP in a communication network which is an ultra-dense network (UDN).

2. Related Art

In a communication network, a terminal should be allocated resources for communications from a base station to perform the communications with the base station. Also, in order to perform communications with the base station in the communication network, the terminal may receive information on a transmission format such as the size of data (e.g., payload size), a modulation and coding scheme (MCS), and the like. That is, the terminal may perform communications with the base station based on the information on the transmission format received from the base station.

Specifically, a communication network may be a Long Term Evolution (LTE) based communication network, and may be classified into a communication network based on a frequency division duplex (FDD), and a communication network based on a time division duplex (TDD). For example, in the TDD communication network, an uplink channel may be estimated by receiving and measuring uplink reference signals transmitted from the terminal at the base station, and the estimated uplink channel estimated may be applied to information of a downlink channel based on channel reciprocity. However, a specific method of allocating resources for transmitting the uplink reference signals in a communication network has not yet been defined.

Meanwhile, the LTE based communication network may support coordinated multi-point transmission and reception (CoMP) functions. In particular, the LTE based communication network may support cooperative transmission (or joint transmission (JT)) among the CoMP functions. The joint transmission supported in the LTE based communication network may mean a function for a plurality of base stations included in the communication network to simultaneously transmit signals to a single terminal.

As described above, since operation procedures or frame structures defined in the LTE based communication network are not those defined only for the cooperative transmission, there is a problem that the cooperative transmission or a joint processing (JP) function cannot efficiently support transmission of a control channel and a feedback channel.

SUMMARY

Accordingly, embodiments of the present disclosure provide an operation method of a communication node for performing communications based on coordinated multi-point transmission and reception in an ultra-dense network (UDN).

In order to achieve the objective of the present disclosure, an operation method of a communication node supporting a coordinated multi-point transmission and reception (CoMP) of a terminal based on a plurality of transmission points (TPs) included in a communication network may comprise allocating a resource for transmitting a pilot signal of the terminal; receiving quality measurement information of the pilot signal of the terminal from the plurality of TPs; determining a TP cluster supporting the CoMP of the terminal based on channel states among the plurality of TPs; transmitting information on the allocated resource and information on the TP cluster to the terminal and the TP cluster; and supporting the CoMP of the terminal based on the allocated resource and the TP cluster.

The communication node may be a communication node capable of controlling the plurality of TPs included in the communication network.

The resource may be allocated based on a dynamic resource allocation scheme or a static resource allocation scheme according to whether or not a channel measurement information exists in a frame for the terminal.

The TP cluster may include at least one TP supporting the CoMP of the terminal among the plurality of TPs.

The TP cluster may include a predetermined number of TPs based on an order of good channel states for the terminal among the plurality of TPs included in the communication network.

The predetermined number may be calculated based on a ratio of a number of terminals and a number of TPs existing within a predetermined distance from the terminal.

A message including the information on the allocated resource and the information on the TP cluster may be transmitted to the terminal and the TP cluster through an anchor transmission point (ATP).

The supporting may comprise performing a transmission scheduling for the COMP of the terminal based on the TP cluster; and supporting the CoMP of the terminal based on a result of the transmission scheduling.

The performing a transmission scheduling may comprise maximizing a received power of the terminal by allocating a power for the terminal based on a maximum ratio transmission (MRT) precoding; and minimizing an interference power of the terminal by allocating a power for the terminal based on a zero-forcing (ZF) precoding.

The received power of the terminal may be maximized based on a parameter set to limit a maximum value of the received power allocated based on the MRT precoding within a predetermined range.

The minimizing may further comprise calculating an interference power generated by the maximized received power; and allocating a power for the terminal which minimizes the calculated interference power based on the ZF precoding.

In order to achieve the objective of the present disclosure, an operation method of a transmission point (TP) supporting a coordinated multi-point transmission and reception (CoMP) of a terminal in a communication network may comprise receiving a message including information on a resource for transmitting a pilot signal of the terminal and information on a TP cluster supporting the CoMP of the terminal; transmitting, to a communication node supporting the CoMP of the terminal, a message including channel quality measurement information generated by measuring a channel quality based on the pilot signal received from the terminal; receiving, from the communication node, a message including information on a result of a transmission scheduling performed for the CoMP of the terminal by the communication node and data to be transmitted to the terminal; and transmitting a message including the data to the terminal through the CoMP of the terminal based on the result of the transmission scheduling.

When the TP is an anchor transmission point (ATP) supporting the CoMP of the terminal, the receiving of the message including the information on the resource may further comprise transmitting a message including the information on the resource to the terminal and the TP cluster.

In the transmitting a message including the information on the resource to the terminal and the TP cluster, the message including the information on the resource may be transmitted to the terminal and at least one supplementary transmission point (STP) included in the TP cluster.

The information on the resource and the information on the TP cluster may be received from a communication node capable of controlling a plurality of TPs included in the communication network.

When the TP is an anchor transmission point (ATP) supporting the CoMP of the terminal, the operation method may further comprise transmitting a synchronization signal and a system broadcast information for an initial access of the terminal; performing an initial access procedure based on an initial access signal of the terminal received from the terminal for an initial access to the TP; and transmitting a message including information of the terminal for which the initial access procedure has been completed to the communication node.

When the TP is an anchor transmission point (ATP) supporting the CoMP of the terminal, the operation method may further comprise receiving a message including a feedback information of the terminal with respect to the transmission of the data from at least one TP included in the TP cluster; and transmitting a message including the feedback information to the communication node. According to the embodiments of the present disclosure, a high capacity service can be provided to a user terminal based on CoMP in a communication network which is an ultra-dense network (UDN). Also, the operation method of a communication node according to the present disclosure has an effect of improving the communication performance of the communication network which is the UDN supporting cooperative transmission through multiple transmission points.

BRIEF DESCRIPTION OF DRAWINGS

Embodiments of the present disclosure will become more apparent by describing in detail embodiments of the present disclosure with reference to the accompanying drawings, in which:

FIG. 5 is a flowchart for explaining an operation method of a communication node supporting CoMP in a communication network according to another embodiment of the present disclosure;

FIG. 6 is a flowchart for explaining a method of performing transmission scheduling for CoMP in a communication network according to another embodiment of the present disclosure;

DETAILED DESCRIPTION

Figure 1:
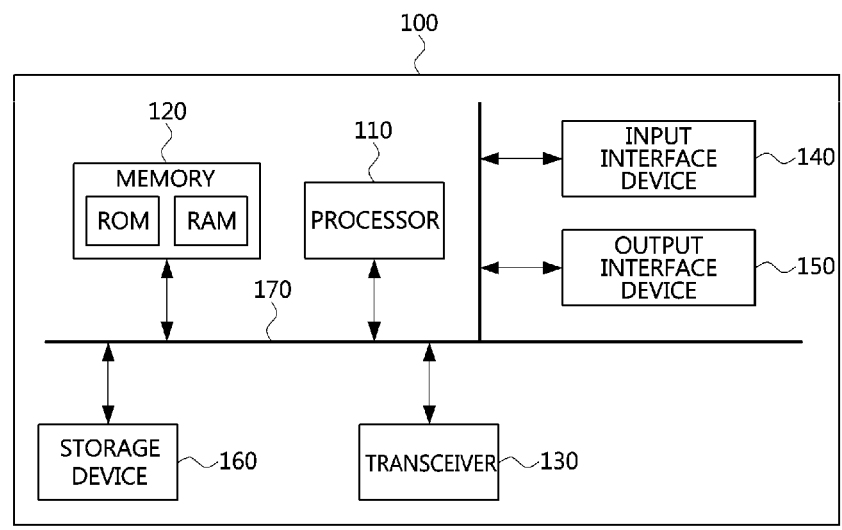
FIG. 1 is a block diagram illustrating a communication node supporting CoMP in a communication network according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating a communication node supporting CoMP in a communication network according to an embodiment of the present disclosure.

Referring to FIG. 1, a first communication node 100 according to an embodiment of the present disclosure may be an apparatus supporting or performing at least one function of a plurality of divided functions of a base station in a communication network.

Specifically, the communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170. However, each of the components included in the communication node 100 may be connected to the processor 110 via a separate interface or a separate bus rather than the common bus 170. For example, the processor 110 may be connected to at least one of the memory 120, the transceiver 130, the input interface device 140, the output interface device 150, and the storage device 160 via a dedicated interface.

The processor 110 may execute a program which is stored in at least one of the memory 120 and the storage device 160 and includes at least one instruction. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM). Here, the program includes at least one instruction executed by the processor 110, which implements a plurality of steps for proposed operation methods of a communication node.

Figure 2:
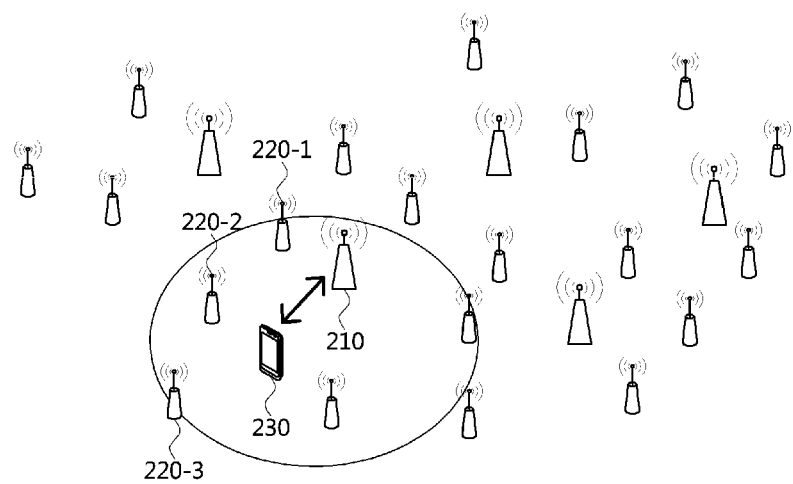
FIG. 2 is a conceptual diagram illustrating a communication network according to an embodiment of the present disclosure.

FIG. 2 is a conceptual diagram illustrating a communication network according to an embodiment of the present disclosure.

Referring to FIG. 2, a communication network according to an embodiment of the present disclosure may include a plurality of transmission points (TPs) capable of supporting coordinated multi-point transmission and reception (CoMP) and a plurality of terminals that perform communications based on the CoMP of the plurality of TPs. That is, the communication network according to an embodiment of the present disclosure may be an ultra-dense network (UDN) including a plurality of TPs at a relatively high density. Here, each of the plurality of TPs and the plurality of terminals included in the communication network may have a structure similar to or the same as the structure of the communication node described with reference to FIG. 1.

Specifically, the plurality of TPs in the communication network may be largely classified into an anchor transmission point (ATP) and supplementary transmission points (STPs) according to their functions to be performed. For example, an ATP 210 and a plurality of STPs 220-1, 220-2, and 220-3 among the plurality of TPs included in the communication network may support CoMP-based communications of a terminal 230 which is one of the plurality of terminals included. Here, the ATP 210 and the plurality of STPs 220-1, 220-2 and 220-3 may form a TP cluster supporting the CoMP-based communications of the terminal 230.

Here, the ATP 210 may have a unique cell identifier (cell ID), and may perform functions related to transmission of network broadcast information and cell-specific information. Also, the ATP 210 may perform functions related to a synchronization acquisition procedure and an initial access procedure of the terminal. That is, the ATP 210 may perform functions related to a control plane of a base station (e.g., small base station) in the TP cluster. Also, the plurality of STPs 220-1 220-2 and 220-3 may perform cooperative transmission (or, JT) of a control channel and a data channel in order to support the CoMP for the terminal 230.

Figure 3:
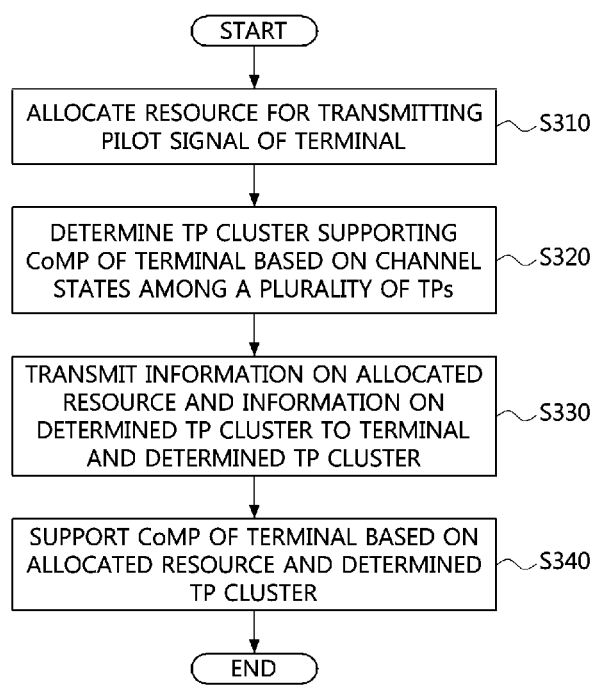
FIG. 3 is a flowchart for explaining an operation method of a communication node supporting CoMP in a communication network according to an embodiment of the present disclosure.

FIG. 3 is a flowchart for explaining an operation method of a communication node supporting CoMP in a communication network according to an embodiment of the present disclosure.

Referring to FIG. 3, a communication network according to an embodiment of the present disclosure may be the UDN which is the communication network described with reference to FIG. 2. An operation method of a communication node supporting CoMP in a communication network according to an embodiment of the present disclosure may be performed in a communication node that supports CoMP of a terminal based on a plurality of TPs included in the communication network. In particular, a communication node according to an embodiment of the present disclosure may be a communication node (e.g. a controller) capable of controlling the plurality of TPs included in the communication network, and may have a structure similar to or the same as the structure of the communication node described with reference to FIG. 1.

First, in the communication network, the communication node may allocate a resource for transmitting a pilot signal of the terminal (S310). The resource allocated by the communication node may mean a resource used for the terminal to transmit a pilot signal. Specifically, the communication node may allocate the resource based on one of a dynamic resource allocation scheme and a static resource allocation scheme according to whether or not a channel measurement information exists in a frame for the terminal in the communication network. In the communication network, the communication node, the plurality of TPs, and the terminal may operate on a frame basis, which will be described in detail below with reference to FIG. 4.

Figure 4:
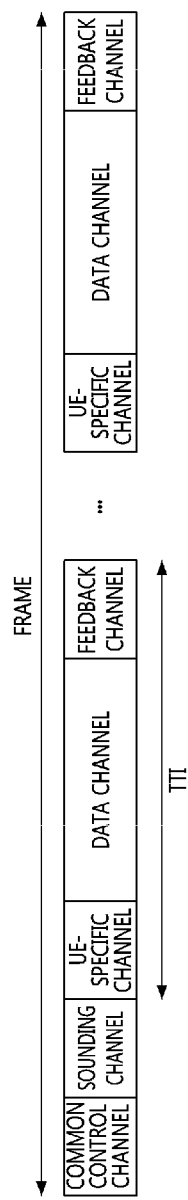
FIG. 4 is a conceptual diagram illustrating an example of a frame used for COMP in a communication network according to an embodiment of the present disclosure.

FIG. 4 is a conceptual diagram illustrating an example of a frame used for COMP in a communication network according to an embodiment of the present disclosure.

Referring to FIG. 4, a frame used for CoMP in a communication network according to an embodiment of the present disclosure may include a common control channel, a sounding channel, a terminal-specific control channel (also referred to as 'user equipment (UE)-specific control channel'), a data channel, and a feedback channel. Here, the frame may include a plurality of subframes (e.g., each corresponding to a transmission time interval (TTI) which is a transmission and reception unit of terminal and TP). Specifically, a subframe may include the UE-specific control channel, the data channel, and the feedback channel. That is, a frame may include one common control channel, one sounding channel, and the plurality of subframes.

Referring again to FIG. 3, the communication node according to an embodiment of the present disclosure may allocate the resource used for transmitting the pilot signal of the terminal based on the channel measurement information included in the sounding channel of the frame described with reference to FIG. 4. For example, the communication node may allocate resources based on whether or not channel measurement information exists in a relatively recent frame. Specifically, when the channel measurement information measured by the terminal exists in the sounding channel of the frame, the communication node may allocate the resource for transmitting the pilot signal of the terminal based on the dynamic resource allocation scheme. On the other hand, when the channel measurement information measured by the terminal does not exist in the sounding channel of the frame, the communication node may allocate the resource for transmitting the pilot signal of the terminal based on the static resource allocation scheme.

Here, the resource allocated based on the dynamic resource allocation scheme and the resource allocated based on the static resource allocation scheme may be distinguished from each other. For example, when there are Np resources available for the transmission of the pilot signal in the communication network, Nd resources may be allocated based on the dynamic resource allocation scheme, and Ns resources may be allocated based on the static resource allocation scheme. Specifically, the dynamic resource allocation scheme in a communication network according to an embodiment of the present disclosure may be performed through the following procedure.

First, a TP in the communication network may select a terminal for which CoMP is supported based on Equation 1 below.

$$i^* = \mathrm{argmax}_i \sum_{j \in T} |h_{ij}|^2 \qquad \text{[Equation 1]}$$

In Equation 1, $h_{ij}$ may denote a channel element from a transmission point j to a terminal i. Also, T may denote a set of the plurality of TPs. The Equation 1 may provide an example of a method in which a terminal having the largest sum of channel states for a plurality of TPs located adjacently thereto is selected.

Another method of selecting a terminal for which CoMP is supported may be to select a terminal having the largest number of TPs having a channel quality larger than a predetermined value among the TPs located near each terminal. This may be represented by Equation 2 below. In Equation 2, $n\{|h_{ij}|>h_{tr}\}$ may denote the number of TPs having a channel quality larger than the predetermined number with respect to the terminal i.

$$i^* = \mathrm{argmax}_{i,(j \in T)} \{n\{|h_{ij}|>h_{tr}\}\} \qquad \text{[Equation 2]}$$

Then, the communication node may select a pilot index that does not overlap with already-allocated pilot indexes of pilot signals based on Equation 3 below among all of selectable pilot indexes.

$$p^* = \mathrm{argmin}_p \left\| P_i \cdot \left( \sum_{k \in U(p)} P_k \right) \right\| \qquad \text{[Equation 3]}$$

In Equation 3, $P_i$ may refer to a matrix representing received powers of the pilot signal of the terminal i at the plurality of TPs included in the communication network. Also, U(p) may denote a set of terminals determined to transmit a pilot signal (p). Thereafter, the communication node may control a TP supporting CoMP of the selected terminal so that the selected pilot index is allocated to the selected terminal. As described above, the dynamic resource allocation scheme performed in the communication network may have a characteristic of a greedy algorithm that controls a distance between terminals using the same resource to be as far as possible.

Meanwhile, the static resource allocation scheme in the communication network according to an embodiment of the present disclosure may be used when there is no channel measurement information in the frame, as in case of a terminal newly connected to the communication network. Specifically, the resources allocated based on the static resource allocation scheme in the communication network may be resources unique in the communication network. For example, in the communication network, the communication node may allocate unique resources to each of ATPs among the plurality of TPs in order to increase utilization efficiency of the resources allocated based on the static resource allocation scheme. In this case, when a plurality of ATPs exist in the communication network, the communication node may allocate the same resources to the ATPs located at intervals of a predetermined distance or more among the plurality of ATPs (i.e., resource reuse).

Through such a method, the communication node in the communication network may allocate the resource for pilot transmission of the terminal. The resource for pilot transmission may be a time and frequency resource position of a sounding channel through which the pilot signal is to be transmitted by the terminal, an identifier for generating the pilot signal, and the like. Then, the communication node may transmit the resource allocation information for pilot transmission of the terminal to the terminal. Here, the communication node may transfer the resource allocation information for the pilot transmission of the specific terminal to the ATP of the specific terminal in a form of a control message, and the ATP may transmit it to the specific terminal. Here, the ATP may transmit the control message to the corresponding terminal through the common control channel or the UE-specific control channel.

The terminal receiving the resource allocation information for the pilot transmission through the above-described method may transmit its own pilot signal as allocated. Here, all the TPs may measure the quality of the pilot signal received from sounding channels and transmit it to the communication node, and the communication node may acquire the channel information between each TP and the terminals based on the measurement information.

Then, based on channel states, the communication node may determine a TP cluster supporting CoMP of the terminal among the plurality of TPs (S320). Specifically, the TP cluster may include at least one TP supporting CoMP of the terminal among the plurality of TPs. For example, the TP cluster may include the predetermined number of transmission points in an order of good channel states for the terminal among the plurality of TPs included in the communication network. Here, the predetermined number may be calculated based on a ratio of the number of terminals existing within a predetermined distance from the terminal and the number of TPs existing within the predetermined distance from the terminal. That is, a method of determining a TP cluster in a communication network according to an embodiment of the present disclosure will be described in the following two methods.

As the first method, it may be assumed that the number of TPs included in a TP cluster supporting CoMP of each of a plurality of terminals included in a communication network is M. That is, the number of TPs included in a TP cluster for each of the plurality of terminals included in the communication network may be equally set to M. Also, the M TPs included in the TP cluster may be TPs determined based on the order of good channel states for the terminal. Then, the communication node may determine the M TPs determined based on the order of good channel states as the TPs to be included in the TP cluster supporting CoMP of the terminal.

As the second method, it may be assumed that the number of TPs included in a TP cluster supporting CoMP of each of a plurality of terminals included in a communication network is m. Here, in order to calculate m which is the number of TPs included in the TP cluster, t which is the number of TPs existing within a predetermined distance from the terminal and u which is the number of the terminals existing within the predetermined distance from the terminal may be calculated preferentially. Then, m which is the number of TPs included in the TP cluster for the terminal may be calculated based on Equation 4 below.

$$m = \text{floor}(t/u) \quad \text{[Equation 4]}$$

Here, when it is difficult to measure u which is the number of terminals existing within the predetermined distance from the terminal, u may be measured indirectly based on the number of terminals adjacent to the TPs existing within the predetermined distance from the terminal. Then, the communication node may determine the m TPs as the TPs included in the TP cluster based on the order of good channel states among the TPs for each terminal. Accordingly, the communication node may assign a TP point cluster having the larger number of TPs to a terminal existing in an area having a relatively high density of TPs in the communication network. On the other hand, the communication node may assign a TP cluster having the smaller number of TPs to a terminal existing in an area having a relatively low density of TPs in the communication network.

Thereafter, the communication node may transmit a message including information on the allocated resource and information on the assigned TP cluster to the terminal and the assigned TP cluster (S330). Specifically, the communication node may generate the message including the information on the allocated resource and the information on the assigned TP cluster, and transmit the message to the terminal and the assigned TP cluster through an ATP included in the assigned TP cluster.

That is, the communication node may transmit the message including the information on the allocated resource and the information on the assigned TP cluster to the ATP included in the assigned TP cluster. Accordingly, the ATP may transmit the received message to the terminal and at least one TP included in the assigned TP cluster. In this way, the communication node may transmit the message including the information on the allocated resource and the information on the assigned TP cluster to the terminal and the assigned TP cluster.

Then, the communication node may support CoMP of the terminal based on the allocated resource and the assigned TP cluster (S540). Specifically, the communication node may support CoMP-based communications of the terminal through cooperative transmission (or JT) of at least one TP included in the assigned TP cluster. For example, when there is data directed to the terminal, the communication node may transmit a message including the data to at least one TP included in the assigned TP cluster. Accordingly, the at least one TP included in the TP cluster may receive the message including the data directed to the terminal from the communication node. Thereafter, the at least one TP included in the TP cluster may transmit the message including the data to the terminal.

Meanwhile, the at least one TP included in the TP cluster supporting CoMP of the terminal may perform transmission scheduling for CoMP to the terminal. Specifically, the transmission scheduling performed at the at least one TP included in the TP cluster will be described with reference to FIGS. 5 to 8 below.

FIG. 5 is a flowchart for explaining an operation method of a communication node supporting CoMP in a communication network according to another embodiment of the present disclosure.

Referring to FIG. 5, a communication network according to an embodiment of the present disclosure may be the UDN which is the communication network described with reference to FIG. 2. An operation method of a communication node supporting CoMP in a communication network according to an embodiment of the present disclosure may be performed in a communication node that supports CoMP of a terminal based on a plurality of TPs included in the communication network. In particular, a communication node according to another embodiment of the present disclosure may be an ATP included in a TP cluster, and may have a structure similar to or the same as the structure of the communication node described with reference to FIG. 1.

First, the ATP in the communication network may receive the message including the information on the allocated resource and the information on the assigned TP cluster supporting CoMP of the terminal (S510). More specifically, the message including the information on the allocated resource and the information on the assigned TP cluster supporting CoMP of the terminal may be received from the communication node capable of controlling the plurality of TPs included in the communication network. Here, the information on the allocated resource may be information on the resource used for transmitting the pilot signal of the terminal.

Then, the ATP may transmit the message including the information on the allocated resource and the information on the assigned TP cluster to the terminal and at least one TP included in the TP cluster (S520). Specifically, the ATP may identify the at least one TP included in the TP cluster, and transmit the message to the terminal and the at least one identified TP.

Then, the ATP may perform transmission scheduling for CoMP of the terminal based on the TP cluster (S530). Here, the ATP may perform transmission scheduling so that the transmission amount of the at least one TP included in the TP cluster is maximized. That is, the transmission scheduling performed in the communication network may be performed such that the amount of data transmitted to the terminal is maximized, which may be expressed by Equation 5 below.

$$\max \sum_i w_i r_i \quad \text{[Equation 5]}$$

$$r_i = \log(1 + \gamma_i)$$

$$\gamma_i = \frac{\left|\sum_{t \in T(i)} \sqrt{p_{it}} h_{it} v_{it}\right|^2}{\sum_{j \neq i} \left|\sum_{t \in T(j)} \sqrt{p_{jt}} h_{jt} v_{jt}\right|^2 + N_0}$$

$$w_i = \text{weighting value for terminal } i$$

In this case, in the transmission scheduling performed at the ATP, a transmission power of each TP k may be limited to $\overline{P_k}$ which is a preset maximum transmission power, and may be included in a range defined by Equation 6 below.

$$\sum_{i \in U(k)} \|v_{ik}\|^2 p_{ik} \leq \overline{P_k} \quad \text{[Equation 6]}$$

Specifically, a method of performing the transmission scheduling at the ATP will be described below with reference to FIGS. 6 to 8.

FIG. 6 is a flowchart for explaining a method of performing transmission scheduling for CoMP in a communication network according to another embodiment of the present disclosure.

Referring to FIG. 6, an ATP in a communication network according to another embodiment of the present invention may maximize a received power of a terminal by allocating a power to the terminal based on a maximum ratio transmission (MRT) precoding (S531). Specifically, the ATP may maximize the received power of the terminal based on a parameter (e.g., α) set to limit the maximum value of the received power allocated based on the MRT precoding to a predetermined range. Here, it is explained that the process of maximizing the received power of the terminal is performed at the ATP, but embodiments of the present disclosure are not limited thereto.

That is, at least one TP (e.g., the ATP and at least one STP) included in the TP cluster may perform a conjugate beamforming for a channel of the terminal for which the at least one TP supports CoMP, thereby maximizing the received power of the terminal. Here, the at least one TP may allocate a power limited based on the parameter α set to limit the power allocated to the terminal to a predetermined range. For example, a method of allocating the power may be performed based on a water-filling algorithm for each TP cluster or a power allocation algorithm in which a power is allocated in proportion to the channel state of the terminal for each transmission point.

Specifically, according to the method of maximizing the received power of the terminal by allocating a power to the terminal based on MRT precoding, a precoding vector as shown in Equation 7 below may be generated.

$$v_i^{(1)} = h^*{}_{iC_i} (=[h_{ij}]^*{}_{(j \in C_i)}) \quad \text{[Equation 7]}$$

In Equation 7, $v_i^{(1)}$ may denote a first-stage precoding vector of the TP cluster $C_i$ of the terminal i. Also, $h_{iC_i}$ may denote a channel matrix between the TP cluster $C_i$ and the terminal i. Here, the power allocated to the TP cluster may be expressed by Equation 8 below.

$$p_i^{(1)} = \text{argmax}_{p_i, j \in C_i} p_i \|v_{i(j)}^{(1)}\|^2 \leq \overline{P_{ij}} = \frac{(\|h_{ij}\|^2)^\gamma}{\sum_{k \in U(j)} (\|h_{kj}\|^2)^\gamma} P_J \quad \text{[Equation 8]}$$

In Equation 1, $p_i^{(1)}$ may denote a first-stage transmission power allocated to the TP cluster. That is, $p_i^{(1)}$ may mean a power allocated to satisfy a constraint on maximum powers of the plurality of TPs included in the communication network in consideration of the maximum power in at least one TP included in the TP cluster. Also, $\overline{P_{ij}}$ in Equation 7 may mean the maximum power which the TP j can allocate to the terminal i. Here, the TP j may allocate the maximum power $\overline{P_j}$ by considering the state of the channel for which the TP cluster to which the TP j belongs supports CoMP. Also, when the parameter α set to limit the power to the predetermined range is applied, the TP j may allocate $\overline{P_j}$ to which the maximum power of the TP j is limited by the parameter α. Also, when the maximum power for each terminal for which CoMP is supported is limited, the TP j may allocate the maximum power for each terminal based on a fairness parameter γ so that the maximum power for each terminal is fairly allocated. For example, as the fairness parameter γ approaches zero, the TP may allocate the same maximum power to respective terminals for which the CoMP is supported. On the other hand, as the fairness parameter γ approaches 1, the TP may allocate the maximum power in proportion to the state of the channel for each terminal for which the CoMP is supported.

Then, the ATP may minimize an interference power of the terminal by allocating a power to the terminal based on a zero-forcing (ZF) precoding (S532). That is, the ATP may allocate a power to the terminal based on the ZF precoding in order to effectively neutralize inter-cluster interference between the respective TP clusters and intra-cluster interference of the TP cluster for each terminal. Specifically, the ATP may calculate an interference power generated due to the maximized received power. Then, the ATP may allocate a power to the terminal for minimizing the interference power calculated based on the ZF precoding. Through this, the ATP may minimize the interference power.

Hereinafter, an example of a process for the APT to minimize the interference power of the terminals will be described with reference to a plurality of equations.

First, an ATP in a communication network may define neighbor terminals to generate a ZF precoding vector. For example, a neighbor terminal set $N_i$ including at least one neighbor terminal for the terminal i may mean a set of terminals that are interfered by signals transmitted for the terminal i. The size of the neighbor terminal set $N_i$ may be smaller than or equal to $(|C_i|-1)$ which is a value obtained by subtracting 1 from $|C_i|$ which is the number of TPs included in the TP cluster of the terminal i. Here, whether or not an influence due to interference exists may be determined based on Expression 9 below.

$$n_{ij} = \frac{\|h_{jC_i} h_{iC_i}^*\|^2}{\|h_{iC_i} h_{iC_i}^*\|^2} \text{ for } j \neq i \quad \text{[Equation 9]}$$

In the communication network, the TP cluster $C_i$ for each terminal may determine at most $(|C_i|-1)$ terminals as the neighbor terminals based on $n_{ij}$ which represents whether an influence due to interference exists or not. Here, a minimum interference amount $\underline{n}$ (e.g., $\underline{n}$ may be set to 0.5) may be defined, and a terminal having an interference smaller than nmay not be included in the neighbor terminals. Meanwhile, a ZF precoding vector in the communication network may be generated through the following procedure. First, at least one TP included in the TP cluster in the communication network may generate a channel matrix for the neighbor terminals as shown in Equation 10. Here, a precoding vector $v_i^{(2)}$ may be calculated based on Equation 11 corresponding to the ZF precoding.

$$H_i[h_{ii}, h_{j_1 i}, \ldots h_{j_{|n_i|} i}] \quad \text{[Equation 10]}$$

$$v_i^{(2)} = v_{i(:,1)} \quad \text{[Equation 11]}$$

$$V_i = \frac{1}{\sqrt{\gamma}} H_i^H (H_i H_i^H)^{-1},$$

where $\gamma = \text{trace}((H_i H_i^H)^{-1})$

The precoding vector $v_i^{(2)}$ calculated based on Equation 11 may be a precoding vector for preventing a signal of a TP included in the TP cluster from interfering with the neighbor terminals. That is, an interference signal for minimizing the interference power in the communication network may be effectively generated based on the precoding vector calculated based on Equation 11, and an interference signal generated due to the transmission scheduling may be removed based on the interference signal for minimizing the interference power. Here, the interference signal generated due to the transmission scheduling may be calculated as shown in Equation 12 below in the process of maximizing the received power of the terminal.

$$I_{ij} = h_{iC_j}(\sqrt{p_j} v_j^{(1)}) \quad \text{[Equation 12]}$$

The intensity of the interference signal may be expressed as $\|I_{ij}\|^2$ on the basis of Equation 12. Here, a terminal that affects to each terminal i due to the intensity of the interference signal may be defined as a neighbor terminal $IN_i$. Also, a minimum relative intensity $\underline{I}$ (e.g., the minimum relative intensity $\underline{I}$ corresponding to the minimum interference amount may be defined as 0.1) of the interference signal relative to a self-signal intensity (i.e., $\|S\|^2$, wherein $S = h_{iC_i}(\sqrt{p_i} v_i^{(1)})$) may be defined. Accordingly, a terminal having interference smaller than the minimum relative intensity $\underline{I}$ of the interference signal may not be included in the neighbor terminals having interference.

Then, the TP cluster of each terminal in the communication network may allocate a power for neutralizing the interference based on the interference signal intensity of the neighbor terminals. Here, the maximum allocated power may be calculated by Equation 13 below. Also, as explained in the step S531 of FIG. 6, the parameter $\alpha$ for limiting the power within the predetermined range may be applied to the maximum allocated power, and accordingly at least $(1-\alpha)$ times of the maximum available power may be allocated as the maximum allocated power.

Also, in the process of determining the size of the maximum power for each TP, the fairness parameter $\gamma$ may be applied as performed in the step S531 of FIG. 6.

$$p_i^{(2)} = \text{argmax}_{p_i, j \in C_i} p_i \|v_{i(j)}^{(2)}\|^2 \leq \overline{P_{i,j}} = \frac{(\|h_{ij}\|^2)^\gamma}{\sum_{k \in U(j)} (\|h_{ij}\|^2)^\gamma} \overline{P_j} \quad \text{[Equation 13]}$$

Here, each TP cluster may transmit a signal for neutralizing a signal of each neighbor terminal based on the maximum allocated power $p_i^{(2)}$ determined based on Equation 13.

For example, a precoding vector $v_i^{(2),j}$ and a power $p_i^{(2),j}$ for neutralizing the signal of the neighbor terminal j in the TP cluster of the terminal i may be calculated by Equation 14 below.

$$v_i^{(2),j} = -\frac{I_{ij}}{\|I_{ij}\|} v_i^{(2)} \quad \text{[Equation 14]}$$

$$p_i^{(2),j} \leq \frac{\|I_{ij}\|^2}{\|h_{iC_i} v_i^{(2),j}\|^2} = \frac{\|I_{ij}\|^2}{\|h_{iC_i} v_i^{(2)}\|}$$

That is, each TP cluster may allocate the power $p_i^{(2),j}$ for neutralizing the signal causing interference by the neighbor terminal. Here, each TP cluster may preferentially allocate a power for neutralizing a signal of a neighbor terminal having a large signal generating interference. Also, if there is a residual power after neutralizing the signal causing the interference by the neighbor terminal, the residual power may be defined as Equation 15 below.

$$p_i^{(2),i} = p_i^{(2)} - \sum_{j \in N_i} p_i^{(2),j} \quad \text{[Equation 15]}$$

The residual power $p_i^{(2),i}$ defined on the basis of Equation 15 may be used to increase the self-signal intensity based on MRT precoding. The defined residual power $p_i^{(2),i}$ may also be used to increase the self-signal intensity based on ZF precoding. In the process of performing transmission scheduling as described above, the described precoding and power may be allocated on the basis of a plurality of equations. Here, a signal transmitted by each TP cluster may be expressed by Equation 16 below.

$$y_i = \sqrt{p_i^{(1)}} v_i^{(1)} s_i + \Sigma_{j \in N_i} \sqrt{p_i^{(2),j}} v_i^{(2),j} s_j \quad \text{[Equation 16]}$$

The signal expressed by Equation 16 may represent a case where the residual power $p_i^{(2),i}$ is not used. Also, when a power equal to the power allocated in the process of maximizing the received power of the terminal and minimizing the interference power of the terminal is applied, a signal represented as $\sqrt{p_i^{(2),i}} v_i^{(1)} s_i$ and a signal represented as $\sqrt{p_i^{(2),i}} v_2^{(1)} s_i$ may be added to the signal represented by Equation 16. Meanwhile, an example of a process for minimizing interference power based on ZF precoding in a communication network will be described below with reference to FIGS. 7 and 8.

Figure 7:
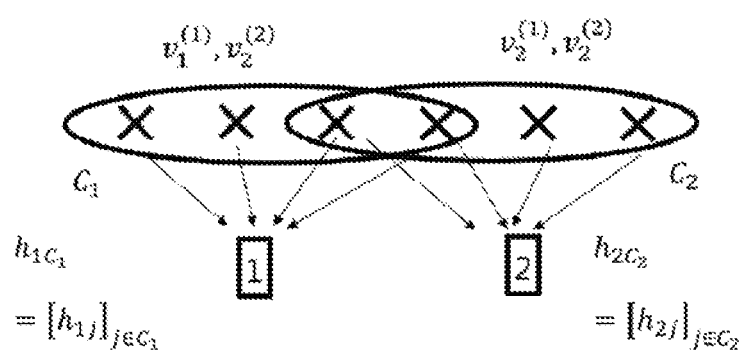
FIG. 7 is a conceptual diagram illustrating a method of performing transmission scheduling for CoMP in a communication network according to another embodiment of the present disclosure.
Figure 8:
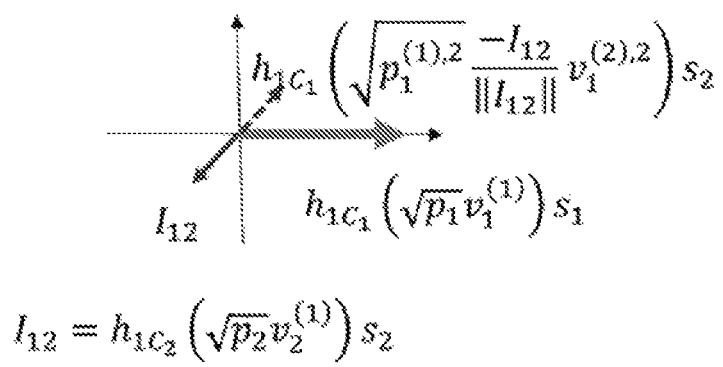
FIG. 8 is a conceptual diagram illustrating a signal space in which CoMP is performed in a communication according to another embodiment of the present disclosure.

FIG. 7 is a conceptual diagram illustrating a method of performing transmission scheduling for CoMP in a communication network according to another embodiment of the present disclosure, and FIG. 8 is a conceptual diagram illustrating a signal space in which CoMP is performed in a communication according to another embodiment of the present disclosure.

Referring to FIG. 7, a communication network according to another embodiment of the present disclosure may include a first terminal 1 and a second terminal 2 that perform communications based on CoMP of a plurality of TPs. Specifically, the first terminal 1 may perform communications based on CoMP of a plurality of TPs included in a first TP cluster $C_1$. Also, the second terminal 2 may perform communications based on CoMP of a plurality of TPs included in a second TP cluster $C_2$. The signal space of the first terminal 1 in the communication network shown in FIG. 7 will be explained with reference to FIG. 8.

The signal space illustrated in FIG. 8 may be configured with an x-axis and a y-axis. Here, a signal directed to the positive direction of the x-axis in the signal space may represent a desired signal of the first terminal 1, and may be expressed as $h_{1C_1}(\sqrt{p_i}v_1^{(1)})s_1$. Here, a received signal strength of the desired signal of the first terminal 1 may be determined based on the MRT precoding performed in the first cluster $C_1$. Also, in the signal space illustrated in FIG. 8, a signal directed to the negative direction of the x-axis and the negative direction the y-axis may indicate a signal $I_{12}$ in which interference occurs due to a desired signal of the second terminal 2, and may be represented as $h_{1C_2}(\sqrt{p_2}v_2^{(1)})s_2$. Here, the desired signal of the second terminal 2 may be a signal transmitted by the second cluster $C_2$. Also, in the signal space illustrated in FIG. 8, a signal directed to the positive direction of the x-axis and the positive direction the y-axis may indicate a signal for neutralizing the signal $I_{12}$ causing interference, and may be represented as $$h_{1c_1}\left(\sqrt{p_1^{(1),2}}\frac{-I_{12}}{\|I_{12}\|}v_1^{(2),2}\right)s_2.$$

Through such a method, a TP cluster in a communication network may neutralize a signal causing interference due to a desired signal of a terminal.

Referring again to FIG. 5, the ATP in the communication network may support CoMP of the terminal based on the transmission scheduling result (S540). That is, the ATP may support the CoMP of the terminal by performing the transmission scheduling described with reference to FIGS. 6 to 8. Meanwhile, the present disclosure also proposes a method for more precisely neutralizing a signal causing interference during the transmission scheduling of the communication network.

Specifically, the TP cluster (i.e., at least one TP included in the TP cluster) of the communication network according to the present disclosure may update the parameter α described with reference to the step S531 of FIG. 6 (e.g., the parameter of the TP i is $\alpha_i$) in units of subframes, each of which is a TTI unit for which the transmission scheduling is performed.

For example, each of the plurality of TPs included in the communication network may set the parameter $\alpha_i$ to an initial value $\alpha_{default}$. Here, a minimum value $\alpha_{min}$ and a maximum value $\alpha_{max}$ for the initial value $\alpha_{default}$ of the parameter may be set. Then, each of the plurality of TPs may identify whether or not there is a residual power for each subframe which is a TTI unit (e.g., time index: t).

Then, when there is a residual power for the predetermined number or more of TP clusters among a plurality of TP clusters in which the respective TPs are included, each of the plurality of TPs may set the parameter $\alpha_i(t+1)$ to be min $(\alpha_{max}, \alpha_i+\Delta\alpha)$. On the other hand, when there are not residual powers for the predetermined number or more of TP clusters among the plurality of TP clusters in which the respective TPs are included, each of the plurality of TPS may set the parameter $\alpha_i(t+1)$ to be max $(\alpha_{min}, \alpha_i-\Delta\alpha)$. That is, each of the plurality of TPs may adaptively control the parameter α based on the presence or absence of the residual power.

Through such a method, transmission scheduling may be performed in the communication network, and information on the transmission scheduling result may be transmitted to the ATP included in the TP cluster of each terminal. Then, the ATP included in the TP cluster of each terminal may calculate an expected reception signal-to-interference-plus-noise ratio (SINR) for each terminal based on the information on the transmission scheduling result, and may perform operations of respective layers such as a channel coding based on the expected reception SINR.

Then, in the communication network, the ATP may generate control information for supporting the CoMP of the terminal, and transmit a message including the generated control information to at least one TP (e.g., STP) included in the TP cluster and the terminal. Here, the message including the control information may be transmitted through a control channel for the terminal. Accordingly, the terminal may receive the message including the control information and obtain the control information from the message.

Meanwhile, transmission scheduling for CoMP in the communication network may be performed based on the same scheduling result as that of the data channel. Also, the transmission scheduling for CoMP may be performed separately in addition to that of the data channel in consideration of characteristics of the control channel. For example, the characteristics of the control channel may be different in that a plurality of control channels (e.g., $N_C$ channels) exist and a target SINR exists. Here, the target SINR among the characteristics of the control channel may mean that the same target SINR is required when the same size of control messages is assumed for the plurality of terminals included in the communication network.

Also, the separate transmission scheduling for the transmission of the message including the control information may comprise a step of performing transmission based on MRT precoding, a step of separating channels of interfering neighbor terminals, and a step of setting a signal intensity satisfying the target SINR in the environment where the channels are separated. Then, the TP included in the TP cluster may transmit a control message to the terminal based on the transmission scheduling result after the transmission scheduling for the transmission of the control message is performed.

Accordingly, the terminal may perform blind decoding in the control channel, and may receive the control message through the blind decoding. Then, the terminal may receive data on the data channel based on the received control message. Here, the TP included in the TP cluster may transmit the data based on the transmission scheduling result for the data channel in the transmission procedure through the data channel.

After receiving the data through the data channel, the terminal can generate feedback information on the reception result. Then, the terminal may generate a message including the feedback information, and transmit the message to the TP included in the TP cluster through a feedback channel.

Meanwhile, although the transmission scheduling in the communication network according to the present disclosure has been described as being performed at the ATP, it is not limited thereto. That is, the transmission scheduling in the communication network may be performed at a communication node capable of controlling a plurality of TPs included in the communication network. In other words, the transmission scheduling for supporting CoMP for a terminal in the communication network may be performed at the ATP supporting CoMP for the terminal and the communication node capable of controlling the plurality of TPs included in the communication network.

Meanwhile, another embodiment of an operation method of a TP for supporting CoMP for a terminal in the communication network according to the present disclosure may be described below. First, in the communication network, a TP may receive a message including information on a TP cluster supporting CoMP for a terminal and information on a resource for transmitting a pilot signal of the terminal. For example, the TP may be an ATP supporting CoMP for the terminal, and the TP may transmit a message including the information on the resource to the terminal and the TP cluster. That is, the message including information on the resource may be transmitted to at least one STP included in the TP cluster. Also, the message including the information on the resource may be received from a communication node capable of controlling a plurality of TPs included in the communication network.

Then, the TP may transmit a message including channel quality measurement information generated by measuring a channel quality for a pilot signal received from the terminal to the communication node supporting CoMP. Thereafter, the TP may receive from the communication node a message including information on a result of transmission scheduling performed for CoMP for the terminal at the communication node and data to be transmitted to the terminal. Then, the TP may transmit a message including the data through CoMP for the terminal to the terminal based on the result of the transmission scheduling. In this case, an ATP in the communication network may transmit a synchronization signal and system broadcast information for initial access of the terminal. Thereafter, the ATP may transmit a message including information of the terminal having completed the initial access procedure to the communication node. Also, the ATP in the communication network may receive a message including feedback information of the terminal with respect to the transmission of the data through CoMP from at least one TP included in the TP cluster. Then, the ATP may transmit a message including the feedback information to the communication node.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a communication node supporting a coordinated multi-point transmission and reception (CoMP) of a terminal based on a plurality of transmission points (TPs) included in a communication network, the operation method comprising:
    allocating a resource for transmitting a pilot signal of the terminal;
    transmitting information on the resource for transmitting the pilot signal of the terminal to an anchor transmission point (ATP);
    receiving quality measurement information of the pilot signal of the terminal from the plurality of TPs;
    determining a TP cluster supporting the CoMP of the terminal based on channel states among the plurality of TPs; and
    transmitting information on the TP cluster to the ATP,
    wherein the TP cluster includes the ATP and at least one supplementary transmission point (STP), and
    wherein a message including the information on the TP cluster is transmitted from the communication node to the ATP, the ATP performs an access procedure of the terminal, and the at least one STP performs an operation for supporting the CoMP for the terminal.

2. The operation method according to claim 1, wherein the communication node is capable of controlling the plurality of TPs included in the communication network.

3. The operation method according to claim 1, wherein the resource is allocated based on a dynamic resource allocation scheme or a static resource allocation scheme according to whether or not channel measurement information exists in a frame for the terminal.

4. The operation method according to claim 1, wherein the TP cluster includes a predetermined number of TPs based on an order of good channel states for the terminal among the plurality of TPs included in the communication network.

5. The operation method according to claim 4, wherein the predetermined number is calculated based on a ratio of a number of terminals and a number of TPs existing within a predetermined distance from the terminal.

6. The operation method according to claim 1, further comprising:
    performing a transmission scheduling for the CoMP of the terminal based on the TP cluster;
    transmitting information on the allocated resource and information on a transmission format to the ATP; and
    supporting the CoMP of the terminal based on a result of the transmission scheduling,
    wherein a message including the information on the allocated resource and the information on the transmission format is transmitted from the communication node to the ATP, and the message is transmitted from the ATP to the at least one STP.

7. The operation method according to claim 6, wherein the performing a transmission scheduling comprises:
    maximizing a received power of the terminal by allocating a power for the terminal based on a maximum ratio transmission (MRT) precoding; and
    minimizing an interference power of the terminal by allocating the power for the terminal based on a zero-forcing (ZF) precoding.

8. The operation method according to claim 7, wherein the received power of the terminal is maximized based on a parameter set to limit a maximum value of the received power allocated based on the MRT precoding within a predetermined range.

9. The operation method according to claim 7, wherein the minimizing further comprises:
    calculating an interference power generated by the precoding to maximize received power; and allocating a power for the terminal which minimizes the calculated interference power based on the ZF precoding.

10. An operation method of an anchor transmission point (ATP) supporting a coordinated multi-point transmission and reception (CoMP) of a terminal in a communication network, the operation method comprising:
receiving, from a communication node, information on a resource for transmitting a pilot signal of the terminal;
transmitting a first message including the resource for transmitting the pilot signal of the terminal to the terminal;
generating channel quality information by measuring a channel quality based on a pilot signal received from the terminal;
transmitting the channel quality information to the communication node; and
receiving, from the communication node, information on a TP cluster supporting the CoMP of the terminal;
wherein the TP cluster includes the ATP and at least one supplementary transmission point (STP), the ATP performs an access procedure of the terminal, and the at least one STP performs an operation for supporting the CoMP for the terminal.

11. The operation method according to claim 10, further comprising:
receiving information on a transmission format from the communication node;
transmitting a second message including the information on the resource to the terminal; and
transmitting a third message including the information on the resource and the information on the transmission format to the at least one STP.

12. The operation method according to claim 10, further comprising:
performing a transmission scheduling for the CoMP of the terminal based on the TP cluster;
transmitting a second message including the information on the resource to the terminal; and
transmitting a third message including the information on the resource and information on a transmission format to the at least one STP.

13. The operation method according to claim 10, further comprising,
transmitting a synchronization signal and a system broadcast information for an initial access of the terminal;
performing an initial access procedure based on an initial access signal of the terminal received from the terminal for an initial access to the TP; and
transmitting a fourth message including information of the terminal for which the initial access procedure has been completed to the communication node.

14. The operation method according to claim 10, further comprising,
receiving a fifth message including feedback information of the terminal with respect to transmission of data from the at least one STP included in the TP cluster; and
transmitting the fifth message including the feedback information to the communication node.

15. The operation method according to claim 1, further comprising:
transmitting information on a channel state between the terminal and TPs in the TP cluster to the ATP; and
supporting the CoMP of the terminal based on a result of a transmission scheduling of the ATP,
wherein a message including the information on the allocated resource and information on a transmission format is transmitted from the ATP to the at least one STP.

16. The operation method according to claim 15, wherein the transmission scheduling of the ATP comprises:
maximizing a received power of the terminal by allocating a power for the terminal based on a maximum ratio transmission (MRT) precoding; and
minimizing an interference power of the terminal by allocating the power for the terminal based on a zero-forcing (ZF) precoding.

17. The operation method according to claim 16, wherein the received power of the terminal is maximized based on a parameter set to limit a maximum value of the received power allocated based on the MRT precoding within a predetermined range.

18. The operation method according to claim 16, wherein the minimizing further comprises:
calculating an interference power generated by the precoding to maximize received power; and
allocating a power for the terminal which minimizes the calculated interference power based on the ZF precoding.

* * * * *